INVENTOR.
MICHAEL S. SCHILLER

United States Patent Office 3,560,827
Patented Feb. 2, 1971

3,560,827
SYSTEM FOR CONTROLLING THE VELOCITY AND POSITION OF A ROTATING MEMBER
Michael S. Schiller, New York, N.Y., assignor, by mesne assignments, to Security Trust Company of Rochester (Trustee), Rochester, N.Y., a banking corporation of New York
Filed May 9, 1969, Ser. No. 823,469
Int. Cl. H02p 7/70
U.S. Cl. 318—341      16 Claims

ABSTRACT OF THE DISCLOSURE

There is disclosed a system for controlling the rotational velocity and phase (position) of a continuously rotating device such as a magnetic drum. A measurement train of pulses is compared with a reference train of pulses in a closed loop to lock the rotational velocity of the drum to that dictated by the frequency of the reference train. Once during each full rotation of the drum a measurement index pulse is provided. This measurement index pulse is compared with a reference index pulse in a closed loop system to provide positioning (phase) control over the rotating drum. In order to provide both position and frequency control, side band generation is provided using the reference signal for the center frequency. The frequency of the modulating signal, and thus the deviation of the side band from center frequency, is determined by the magnitude of displacement between measurement index signal and the reference index signal. The upper or lower side band is selected as a function of the direction of displacement of the measurement index signal from the reference index signal. In any case, when there is an index error, a side band signal is employed as the command signal. This command signal is compared with the main measurement signal to cause the drum to speed up or slow down until the index error is eliminated. When index synchronization is achieved, the main reference signal is employed as the command signal so that the frequency of the drum is locked to that dictated by the main reference signal. In addition, once index synchronization has been achieved, further position control is provided within the span of a single measurement signal pulse by virtue of a modification to the width of the command signal pulses by an amount in a direction tending to cause measurement signal pulses and main reference signal pulses to become coincident in phase.

This invention relates in general to an electrical control system for controlling the velocity and position of a member having periodic motion such as a rotating drum and more particularly to the control and synchronization of the velocity and position of a plurality of continuously rotating magnetic drums.

BACKGROUND OF THE INVENTION

The particular application to which this invention is initially addressed is to the synchronization of two or more continuously rotating magnetic storage drums so that a sequential reading of the information on the drums may be made.

If in a particular memory unit, capacity is required greater than that which can be held on a single magnetic storage drum, it becomes necessary to use a number of drums and to synchronize these drums so that a reading device for taking information off the drum can do so in the required ordered fashion. To achieve this result requires not only that the drums rotate at an equal and constant velocity, but also that the drums be positionally indexed relative to one another. Thus positional synchronization as well as velocity synchronization is required. The positional synchronization is required so that a reading that goes from one drum to another can be properly correlated. Because of the density of information carried by the drums, a very precise positional synchronization and indexing is required.

Accordingly, it is a major purpose of this invention to provide a system for controlling the velocity and position of a continuously rotating member, such as a magnetic drum, to a high degree of accuracy.

It is a related purpose of this invention to so control the velocity and position of a plurality of drum that the drums can be synchronized in velocity and position to one another.

There are many techniques for obtaining highly accurate velocity control and one such technique is disclosed in the copending application "Comparator Circuit" Ser. No. 677,834 filed in the U.S. Patent Office on Oct. 12, 1967. The embodiment disclosed of this invention may employ a velocity control arrangement essentially similar to that disclosed in this copending patent application. However, it is also essential that the position of the drum be controlled at the same time that its velocity is controlled. This control of drum position is not simply a control over positional perturbations, although such control is also important. But what is additionally required is that the drum be indexed in such a fashion that it can be properly positionally synchronized with another drum comparably indexed. This means that if the drum being controlled is considered to be divided up into 360°, then when the zero degree point on any one drum passes a fixed position, the zero point on the other drum also passes a predetermined fixed position. The result electronically is the same as if the two drums were axially aligned and mechanically locked to one another.

Accordingly, it is an important purpose of this invention to provide an index synchronization control.

It is a further important purpose of this invention to provide a highly accurate index synchronization control.

In order to obtain accurate continuous velocity control, the drum measurement signal and the reference command signal must be allowed a degree of relative phase variability in order to adjust to loads on the drum being controlled and to overcome load perturbations. In effect, it is the phase displacement between the measurement signal and the reference signal which determines the magnitude of the actual control signal. The control signal must be varied in order to maintain a constant predetermined velocity and thus the phase displacement between measurement and reference signals would normally have to vary. But, in order to obtain highly precise positional control, it is necessary that the phase of the reference signal accurately and unvaryingly determine the phase of the measurement signal.

Accordingly, it is a further important object of this invention to achieve accurate position control while at the same time achieving accurate velocity control.

BRIEF DESCRIPTION OF THE INVENTION

In brief, the system of this invention provides rotational and positional synchronization between two or more continuously rotating objects such as magnetic drums. A known frequency and phase comparator type of control is employed to provide the rotational velocity control. A measurement clock pulse train from the drum is compared with a reference clock pulse train in a frequency and phase comparator to provide a control signal that locks the frequency of the measurement clock pulse train to the frequency of the reference clock pulse train and thus provide rotational velocity control. The use of the same reference clock signal to control each drum thus provides rotational velocity synchronization.

A relatively coarse positional synchronization is obtained by means of the comparison of a drum index pulse that is generated once for each rotation of the drum with a reference index pulse. Index synchronization requires coincidence, or at least a pre-determined constant positional spacing, between these two index pulses. When index synchronization has been lost, the magnitude of the index error is measured and a reference pulse train generated that has a frequency which is a function of the magnitude and direction of the index error. The basic reference clock signal is used as the center frequency for a side band generator whose side bands are employed to provide this reference pulse train when index synchronization is lost. Thus, as index synchronization is achieved, this system can fall back into employment of the reference clock signal as the basic reference signal for the frequency and phase comparator. But when there is an index error, the reference signal for the frequency and phase comparator is a signal that has a frequency equal to that of the one side bands generated.

In addition, once frequency synchronization and index synchronization is achieved, the phase of the pulses in the reference clock train of pulses and of the pulses in the drum clock train of pulses are compared to that further positional control may be obtained. This additional positional control is to an accuracy equal to the precision with which the clock pulses can be developed. This additional positional control provides a precise positional synchronization between various drum units being controlled and is a positional control within the coarser positional control provided by the index synchronization.

DETAILED DESCRIPTION OF THE PREFERRED EMBODIMENTS

Figure 1:
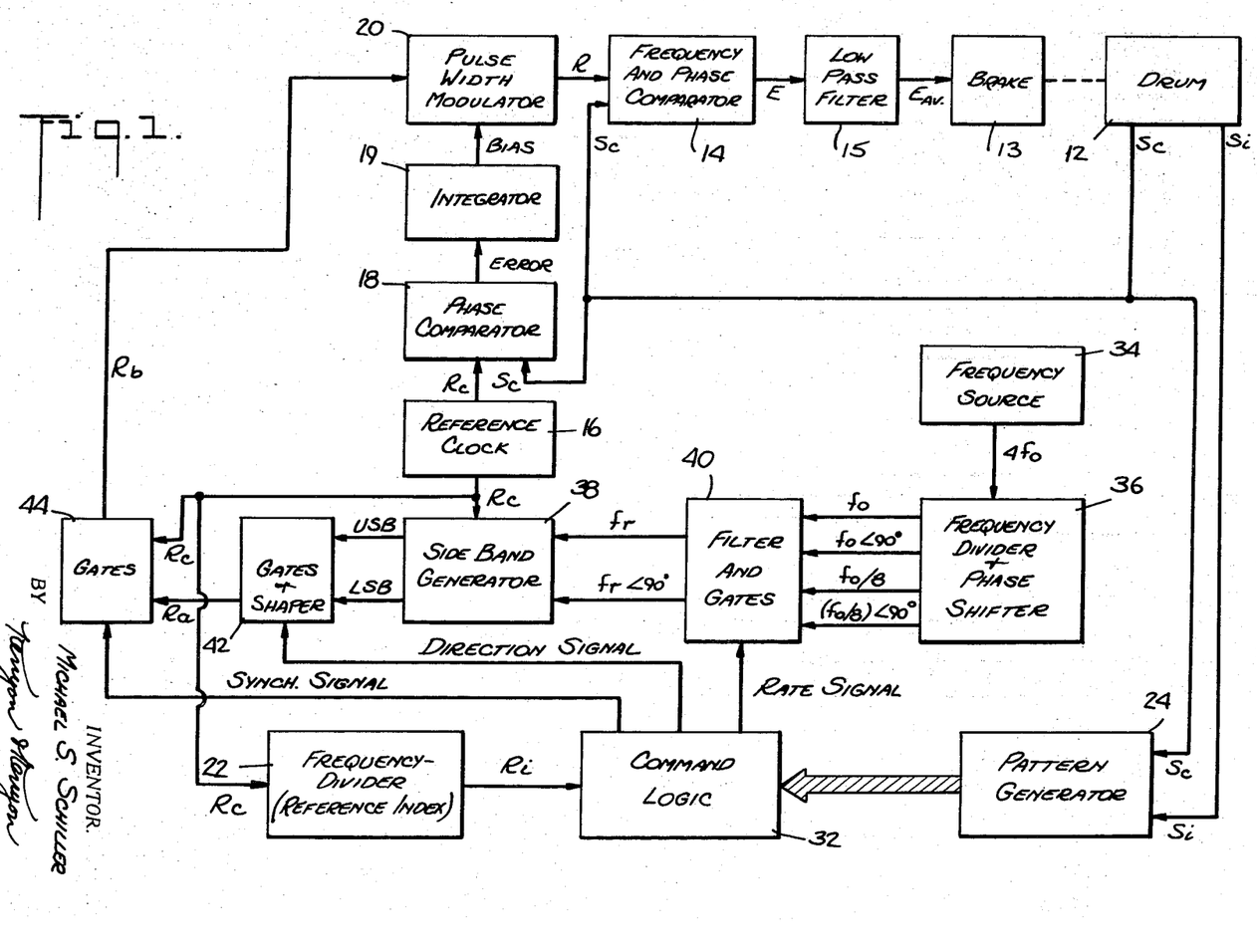
FIG. 1 is a block diagram of an embodiment of the system of this invention adapted to control the rotational velocity and positional phase of a continuously rotating magnetic drum.

FIG. 1 illustrates in block diagrammatic form an embodiment of this invention. The invention is adapted to effect control over the positional phase and rotational velocity of a continually rotating rotary device such as a magnetic drum unit and it will be convenient to describe this FIG. 1 embodiment in terms of control of a magnetic drum unit 12.

Before describing the operation of the FIG. 1 system, it is useful to have in mind the nature of the control signal inputs supplied to the system, as well as the measurement signal inputs provided to the system. The magnetic drum 12 provides two measurement signals, a drum clock signal $S_c$ and a drum index signal $S_i$. The magnetic drum 12 is a continuously rotating magnetic drum 12 having a first magnetic track with, for example, 1,999 poles. A magnetic read-out device thus provides a drum clock signal $S_c$ having 1,999 pulses for each revolution of the drum 12. The drum 12 has a second track having a single pole which provides an index signal pulse $S_i$ once for each revolution of the drum.

A reference clock 16 provides the basic input control signal $R_c$ for the system. The output of the reference clock 16 is a series of pulses $R_c$ which are compared in the system of this invention with the drum clock pulses $S_c$ so as to provide a control that will establish and maintain both frequency synchronization between the drum clock signal $S_c$ and reference clock signal $R_c$.

One of the applications of this invention is to obtain synchronism in both velocity and position between a plurality of magnetic drums. The purpose of such synchronism between various magnetic drums is to permit proper sequential reading from drum to drum. If position synchronization is to be achieved, not only must the drums rotate at the same velocity but they must also be oriented in a constant predetermined angular relationship to one another. A frequency divider 22 provides a reference index signal $R_i$ which is a series of pulses that are, in effect, compared with the drum index signal $S_i$ in such a fashion as to provide the required positioning control.

In brief terms, the reference clock signal $R_c$ is compared with the drum clock signal $S_c$ to force the drum 12 to rotate at a velocity commanded by the frequency of the reference clock signal $R_c$. The reference index signal $R_i$ is compared with the drum index signal $S_i$ to control the rotational position of the drum 12 within an accuracy determined by the rotational angle between successive drum clock pulses $S_c$. In addition, as will be described in detail below, once this rotational and indexing synchronism is obtained, the phase of the reference clock signals $R_c$ and the drum clock signals $S_c$ are compared to provide further control of the position of the drum within the rotational angle between successive drum clock pulses $S_c$.

Thus, if the same reference clock 16 and the same reference index source 22 are employed to control separate drums 12, these separate drums 12 will be synchronized to one another as to both velocity and position. Of course, each drum 12 will require its own control system apart from the input sources 16 and 22.

The drum clock signal $S_c$ is a train of pulses which are compared in a frequency and phase comparator 14 with a reference signal train of pulses R to provide a control signal E for controlling the velocity and phase of the magnetic drum 12. The magnetic drum 12 is driven by an alternating current motor (not shown) and is held down to the commanded speed by a drum brake unit 13. The average value of the control signal E is applied to the drum brake unit and the magnitude of this D.C. control signal $E_{av}$ determines the amount of braking power applied. The phase comparator 14, in such a case, is preferably of the type described in the co-pending patent application, Comparator Circuit, Ser. No. 677,834, filed Oct. 12, 1967. Such a phase comparator provides a series of pulses E that are averaged by the low pass filter 15 to in turn provide the direct current control signal $E_{av}$. As the duty cycle of the pulses E is varied, the magnitude of the direct current control signal $E_{av}$ changes and thus the amount of braking changes. The leading edge of each pulse of the control signal E is determined by the incidence of a pulse from one of the two input pulse train signals $S_c$, R to the comparator 14. The trailing edge of each pulse of the control signal E is determined by the incidence of a pulse of the other one of the two input pulse train signals. In this known fashion, the comparators 14 provides a control signal E which can be employed to lock the pulse repetition rate (frequency) of the drum clock signal $S_c$ to the pulse repetition rate (frequency) of the reference signal R. The phase displacement between these two signals R and $S_c$ will depend on the average magnitude of the control signal E required to apply the braking necessary to cause the magnetic drum 12 to run at the rotational speed commanded by the frequency of the reference signal R.

A reference clock 16 provides a pulse train signal $R_c$ that is employed as the system command signal. The system of FIG. 1 is designed to bring the drum clock $S_c$ to the frequency commanded by the reference clock signal $R_c$. When such frequency synchronization is achieved, the reference clock $R_c$ frequency becomes the frequency of the reference command R. The phase comparator 14 provides the kind of control that causes the drum clock $S_c$ to track in frequency with the command R. Thus when there is an error in drum 12 velocity, the system will respond to such error by generating a change in the frequency of the reference signal R in order to bring the drum 12 to the desired velocity, at which point the error goes to zero and the frequency of the reference signal R becomes the frequency of the reference clock signal $R_c$.

As indicated in the general discussion above, it is a purpose of this invention not only to force the drum to rotate at the commanded velocity so that it is rotating at the same speed as, for example, another drum, but also to command the drum to properly index relative to another similarly controlled drum. What this means is that it is required that the index marker for each drum being controlled in synchronism be at the 360° orientation at the same time so that the sequential scanned reading of the drums can be properly synchronized. A frequency divider 22 operates on the clock reference $R_c$ to provide the reference index signal $R_i$ which is effectively compared by the system of this invention with the drum index signal $S_i$. When the drum index signal $S_i$ is not in synchronism with the reference index signal $R_i$, then this FIG. 1 system provides various operative commands which modify the frequency of the reference signal R in a direction tending to bring the drum index, $S_i$, into synchronism with the reference index $R_i$.

Because the reference clock 16 and reference index 22 are employed to provide the command signals $R_c$ and $R_i$ for duplicate control systems associated with additional drum units, it may be seen that the various drum units being controlled will be in both positional and rotational synchronism with one another.

With the above general operation of the FIG. 1 system in mind, the following detailed description of FIG. 1 will be more readily comprehensible.

THE PATTERN GENERATOR

Figure 1A:
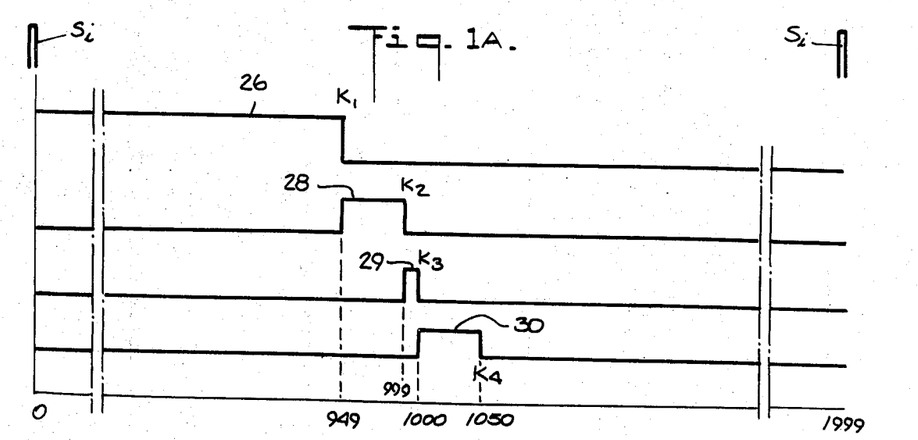
FIG. 1a is a signal diagram representing the output of the pattern generator unit of the FIG. 1 system.

The pattern generator 24 is essentially a counter that provides a pattern of four signals each one of which is initiated and terminated on the incidence of predetermined counts. The design of the pattern generator 24 is described in somewhat greater detail in connection with FIG. 2. FIG. 1a illustrates the pattern of signals put out by the pattern generator 24 and should be referred to in conjunction with this portion of the description of FIG. 1. Essentially, the index signal $S_i$ starts the pattern generator 24 counting the drum clock pulses $S_c$. The pattern generator 24 has a four line output. Arbitrarily assuming 1,999 clock pulses $S_c$ in one rotation of the drum unit 12, the incidence of the index pulse $S_i$ starts the pattern generator 24 counting and provides the signal 26 on a first output line of the pattern generator 24. When the count has gone to a first predetermined number $K_1$ (for example 949) the signal 26 is terminated and a signal 28 is started on a second output line. When the count has gone to a second point $K_2$ which is either at the half-way point or one less than the half-way point (999 in the example shown) the second signal 28 is terminated and a third signal 29 commenced on a third output line. The third signal 29 is terminated at point $K_3$ which is only one count past the initiating count $K_2$. At this point $K_3$, a fourth signal 30 is initiated on the fourth line. This fourth signal 30 is terminated at a predetermined count $K_4$ (for example 1050). The counts $K_1$ and $K_4$ are normally equally spaced from the center point. The next incidence of the drum indexing signal $S_i$ resets the pattern generator 24 and starts the count all over again.

THE COMMAND LOGIC

In this way there are provided four signals 26, 28, 29, 30, the beginnings and terminations of which mark sectors or zones of the drum clock pulses $S_c$ provided during one complete revolution of the drum. By means of the command logic 32, the reference index pulse $R_i$ can be compared with each of these four signals 26, 28, 29, 30 to provide an indication of the zone within which the reference index pulse $R_i$ falls. This then provides an indication of the extent to which the drum index pulse $S_i$ is out of synchronism with the reference index pulse $R_i$. The design of this command logic 32 is described in greater detail in connection with FIG. 2.

Because of the logic involved, it is convenient to have the drum index pulse $S_i$ commanded to be 180° on the drum 12 displaced from the incidence of the reference index pulse $R_i$. In particular, in the example shown the implementation is such that the drum index pulse $S_i$ is commanded to be positioned such that the reference index pulse $R_i$ will fall between the 999th and 1,000th counts and thus between the $K_2$ and $K_3$ points as shown in FIG. 1a. It is only when perturbations cause the drum being controlled to temporarily deviate from this commanded position that the reference index $R_i$ fails to fall within the one count notch between the points $K_2$ and $K_3$.

The break points $K_1$ and $K_4$ are picked, as a function of the dynamics of the system, as points for determining the rate at which a corrective signal is applied to the controlled device 12. If there is an error in the position of the drum index signal $S_i$, then the reference index signal $R_i$ will not fall within the one count notch represented by the signal 29. If the reference index signal $R_i$ falls coincident in time with either the signal 28 or the signal 30 then a first and smaller corrective signal will be applied to relatively slowly bring the drum 12 being controlled to the position that will cause the reference $R_i$ to fall within the notch 29. However, if the perturbation or other disturbance has caused the drum 12 to deviate from the controlled position by a somewhat greater amount (so that the reference index signal $R_i$ falls either coincident with the signal 26 or is not coincident with any one of the four signals shown, and thus is to the right, as seen in FIG. 1a, of the break point $K_4$) then a larger correction is made. In effect the rate of correction on the drum 12 is such that a large error will produce a larger corrective signal until the error is reduced to a predetermined magnitude, represented by $K_1$ and $K_4$. At position errors less than that represented by points $K_1$ and $K_4$, a smaller corrective signal is applied. In this fashion, the system is designed to bring the drum to the notch position 29 as fast as possible yet with a minimum risk of overshoot. Thus the dynamics of the system will determine the break points $K_1$ and $K_4$. The values for these two constants $K_1$ and $K_4$ that are shown are simply possible values in one given system.

Furthermore, comparison of the reference index signal $R_i$ with the four signals shown in FIG. 1a also provides an indication of the direction in which the correction has to be made. When the reference index signal $R_i$ is coincident with the signals 26 or 28, there is an indication that the drum has to be speeded up until the notch 29 is brought over coincident with the reference index signal $R_i$. If the reference index signal $R_i$ is coincident with the signal 30 or with none of the four signals, the drum will have to be slowed down until $R_i$ is coincident with notch 29.

Figure 2:
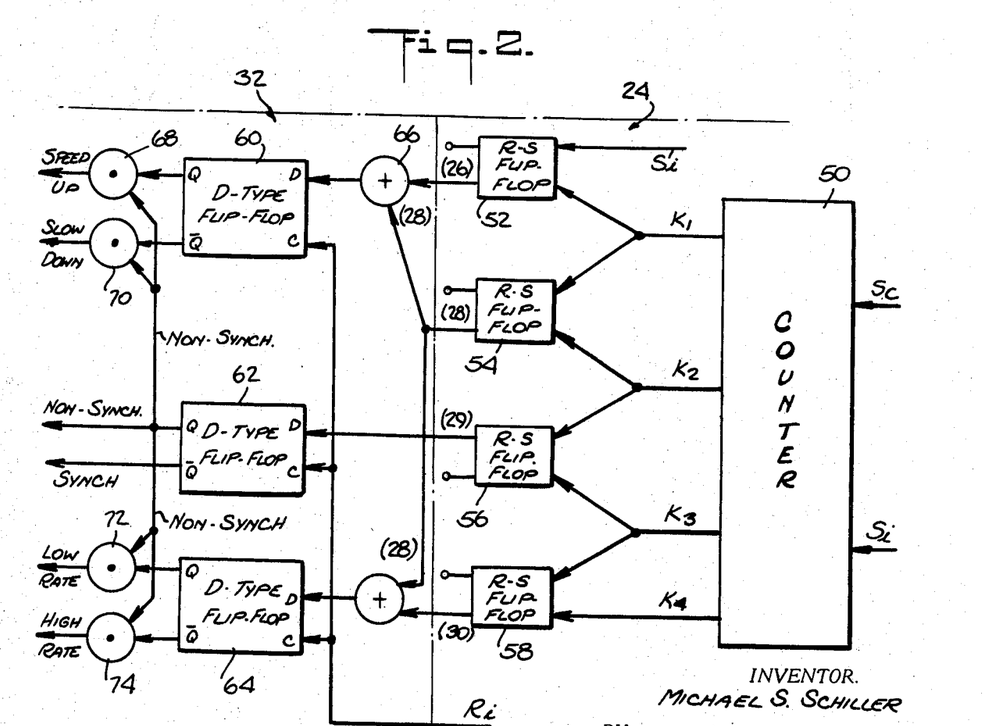
FIG. 2 is a block diagram illustrating the design of the pattern generator 24 and command logic unit 32 of FIG. 1.

The command logic 32, which is illustrated in greater detail in FIG. 2, serves to compare the reference index signal $R_i$ with each of the four outputs from the pattern generator 24. As a result of that comparison, when there is an index error, both a rate signal and a direction signal are provided. When there is no error (that is, when the reference index $R_i$ falls in the notch 29) a synch signal is provided. When there is an error, the rate signal has one of two values. A first value, which commands a low correction rate is provided when the reference index $R_i$ falls coincident with either the signal 28 or the signal 30. A second value commanding a high correction rate is provided when the reference index $R_i$ falls either coincident with the signal 26 or when there is no coincident with any of the four signals 26, 28, 29 and 30, which latter condition indicates that $R_i$ is coincident with some count greater than $K_4$.

Similarly, the direction signal has two values. The direction signal has a first value indicating that the drum being controlled has to be temporarily speeded up whenever the reference index $R_i$ is coincident with either the signal 26 or the signal 28. The direction signal has a second value indicating that the drum has to be slowed down when the reference index $R_i$ is coincident with the signal 30 or when the reference index is coincident with none of the signals 26, 28, 29 and 30.

As indicated above, the synch signal is provided by the logic 32 when the reference index $R_i$ is coincident with the signal 29.

The rate signal, direction signal and/or synch signal from the logic 32 operate to gate in and gate out various other signals which in turn determine the frequency of the reference signal R.

In order to provide the above described indexing and assure a proper frequency and phase relationship between the index reference $R_i$ and clock reference $R_c$, it is important that, as indicated in FIG. 1, the index reference $R_i$ be derived from the clock reference $R_c$.

THE DEVELOPMENT OF THE REFERENCE SIGNAL R

A frequency source 34 provides an output square wave signal having a frequency $4f_o$ of, for example, 160 cycles per second. This 160 cycles per second signal is operated upon by a frequency divider and phase shifter 36 to provide two sets of square wave signals in quadrature. The first set of signals in quadrature has the frequency $f_o$, that is 40 c.p.s. in the example shown. The second set of signals in quadrature has a frequency of, for example, ⅛ frequency $f_o$ and thus is at five cycles per second. The frequency divider and phase shifter 36 is of known design and involves a counter with phase shift logic employing a phase shift register. The input $4f_o$ is a series of pulses which can be counted to provide the four square wave outputs indicated. Because of the requirements for outputs in quadrature, it is necessary that the frequency source 34 output $4f_o$ have a frequency at least four times as great as the highest frequency output from the divider and shifter 36. This is because division by four is necessary to get the 90° shift.

Figure 3:
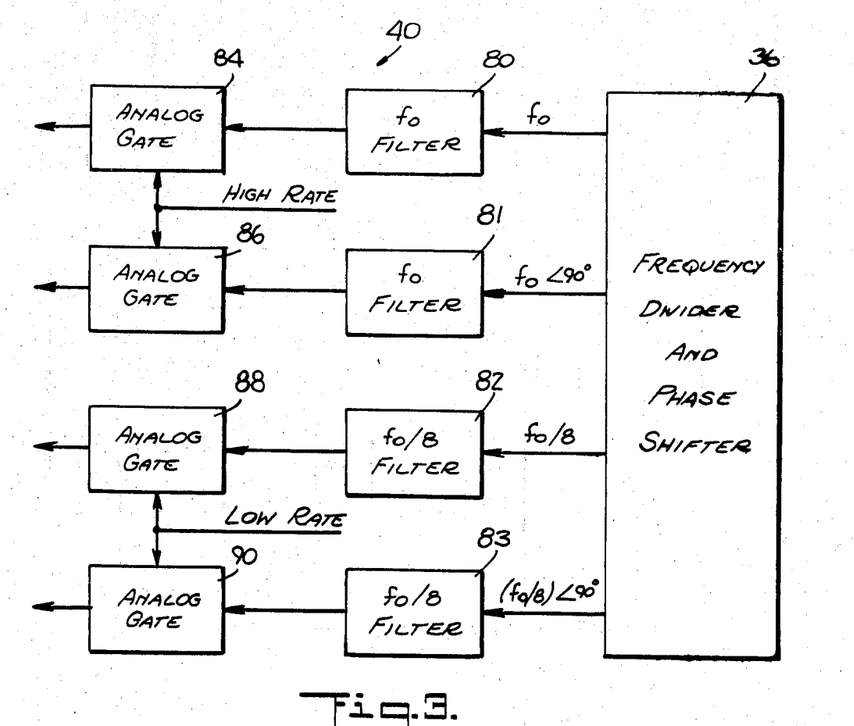
FIG. 3 is a block diagram illustrating the design of the filter and gates unit 40 of FIG. 1.

The square wave outputs of the frequency divider and phase shifter 36 are applied to a filter and gate unit 40 (which is shown in greater detail in FIG. 3). The filters in the unit 40 convert the square wave inputs to sinusoidal waves and the gates in the unit 40 serve to determine which of the two sets of signals is passed through. When the "higher" rate signal is present, appropriate gates are enabled so that the signals having the higher frequency, $f_o$ and $f_o \angle 90°$, are passed through the unit 40. When the rate signal is at its lower indicating level, other gates are enabled so that the lower frequencies, $f_o/8$ and $(f_o/8) \angle 90°$, are passed through the unit 40. The output of the unit 40 accordingly is a pair of sinusoidal signals having exactly the same frequency but in quadrature with one another. The unit 40 output is sinusoidal in order to make feasible the generation of side band generator 38.

The side band generator 38 has as its input carrier frequency the reference clock source 16 signal $R_c$. The side band generator 38 then provides both an upper side band (USB) output and a lower side band (LSB) output, as two separate signals. The deviation of the upper and lower side bands from the carrier frequency of the clock signal $R_c$ will depend upon which of the two frequencies $f_o$ or $f_o/8$ is passed through the gates of the unit 40. In any case, if there was an error in the positioning of the drum index $S_i$ there will be both an upper side band and a lower side band output provided by the generator 38.

An example of the design of a side band generator unit which will function as a side band generator 38 may be found in FIG. 2 of co-pending patent application, Control System, Ser. No. 729,846, filed on Feb. 29, 1968.

Figure 4:
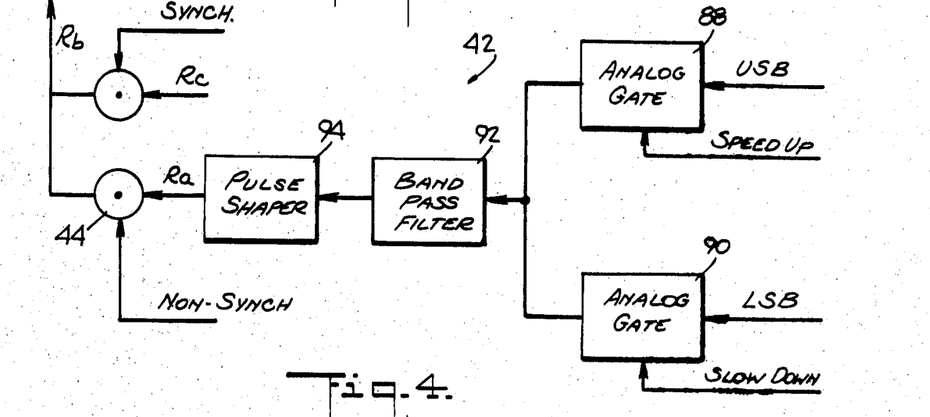
FIG. 4 is a block diagram illustrating the design of the gates and trigger unit 42 and gates unit 44 of FIG. 1.

The direction signal supplied by the command logic 32 is applied to the gates and trigger unit 42 to determine which of the two side band inputs to the unit 42 is passed through as the initial reference signal $R_a$. FIG. 4 illustrates this unit 42 in somewhat more detail. When the direction signal has the value that represents the requirement that the drum 12 be speeded up, appropriate gates in the unit 42 will be enabled to pass the upper side band signal through to become the initial reference signal $R_a$. When the direction signal has the value indicating that the drum 12 has to be slowed up, then appropriate gates in the unit 42 will be enabled to pass the lower side band signal through to become the initial reference signal $R_a$.

It should also be noted that the unit 42 includes a Schmitt trigger to perform the function of converting the sinusoidal upper side band or lower side band signal into a pulse train $R_a$ having a pulse repetition rate equal to the frequency of the side band signal involved. In this fashion a reference signal $R_a$ pulse train is provided as the basis for the reference signal R when there is no synchronization between reference index $R_i$ and drum index $S_i$.

When there is an index error (that is an error in the positioning of the drum index $S_i$), there will be no "Synch" signal and the gates 44 will simply pass the initial reference signal $R_a$ through so that the intermediate reference signal $R_b$ will be that signal dictated by the state of the gates in the units 40 and 42. As will be described further on, the pulse width modulator 20 has no effect on frequency and thus the frequency of the reference signal pulse train R will be that of the intermediate reference signal $R_b$, which in turn means that of the initial reference signal $R_a$ when there is an index error.

Thus, under the conditions where there is an index error, the reference signal R will command a degree of braking that will cause the drum 12 to rotate at a rate such that the drum index $S_i$ error will be eliminated and the reference index $R_i$ falls within the notch 29.

When the index error has been eliminated and the reference index $R_i$ falls within the notch 29, a "Synch" signal will be provided by the logic 32. This Synch signal will switch the state of the gates 44 so as to block whatever output may be provided by the unit 42 and to pass through the reference clock signal $R_c$. As long as the index error is zero, the frequency of the reference command signal R will be that of the reference clock signal $R_c$.

An index error will generate an initial reference signal $R_a$ with a frequency having a side band relationship to the frequency of the reference clock signal $R_c$. The amount of the frequency deviation of $R_a$ from $R_c$ will be a two step function of the magnitude of index error (i.e., low rate or high rate). Whether the frequency deviation of $R_a$ from $R_c$ is above or below will depend on whether the drum 12 has to be temporarily speeded up (USB) or slowed down (LSB).

By means of the units described thus far, it can be seen that the system of FIG. 1 indexes the drum 12 and provides a reference command R having a frequency in synchronization equal to that of the reference clock signal $R_c$. The known operation of the frequency and phase comparator 14 is to control the rotational velocity of the drum 12 to that which locks the frequency of the drum clock $S_c$ input to the comparator 14 to that of the reference signal R input to the comparator 14. In this fashion indexing synchronization is achieved and then rotational velocity synchronization maintained.

Under conditions of index synchronization and of frequency synchronization between the reference clock signal $R_c$ and the drum clock signal $S_c$, a second phase comparator 18, integrator 19 and pulse width modulator 20 are employed to further synchronize the phase of the drum clock signal $S_c$ to the phase of the reference clock signal $R_c$. Thus the system will serve to align plural rotating drums to a positional accuracy within the range covered by a single one of the clock pulses $R_c$, $S_c$.

In the embodiment shown, it is desired to cause the drum clock pulses $S_c$ to fall exactly 180° out of phase with the reference clock pulses $R_c$. This additional position control achieves this result, without changing the width of the control pulses E by, in effect, shifting the phase of the control pulses E. This result can be achieved because the integrator 19 provides a memory. There must be a displacement between the reference pulses R and the drum clock pulses $S_c$ in order to generate the required control pulses E. The magnitude of this displacement is a function of load, specifically of braking power required. On attaining index synchronization, the referenced clock pulses $R_c$ become the intermediate reference signal pulses $R_b$ and initially also become the reference command pulses R. The integrator 19 operates to remember the phase displacement at that point between the signals $R_c$ and $S_c$, and to maintain a corresponding displacement between the reference command R and the drum clock $S_c$ even after the phase displacement between the two clock signals $R_c$ and $S_c$ is wiped out or, as in this embodiment, forced to the 180° phase relationship.

The phase comparator 18 compares the reference clock pulses $R_c$ with the drum clock pulses $S_c$ to provide an output that is equal to zero when the two pulses are exactly 180° out of phase. When the drum clock pulses $S_c$ either lead or lag the reference clock pulses, then the comparator 18 output is an error signal that is either less than zero or greater than zero, depending on whether the error is in load or lag. The integrator 19 stores the error signal provided by the phase comparator 18 to provide a corresponding bias to the pulse width modulator 18. As a consequence, the timing of the trailing edge of the intermediate reference pulses $R_b$ (which in index synchronization are the reference clock pulses $R_c$) is changed to provide the reference command pulses R.

The trailing edges of the reference pulses R turn on (i.e., initiate) the control pulses E. Thus changing the timing of the trailing edge of the reference pulses R tends to result in a change in the pulse width of the control signal E. As a consequence, the drum 12 being controlled is moved in a direction that tends to bring the drum clock pulses $S_c$ to a new position to re-establish the control pulse width E required by the load. This new drum 12 position is ultimately one that makes the phase comparator 18 have an output such that the output of the integrator 19 remains unchanged. This means a drum position in which the drum clock pulses $S_c$ are exactly 180° out of phase with the reference clock pulses $R_c$ since that provides a zero output from the comparator 18. Thus a stable operating condition is achieved in which the reference pulses R have been shifted relative to the reference clock pulses $R_c$ to an extent and by an amount sufficient to cause the drum clock pulses $S_c$ to be 180° out of phase with the reference clock pulses $R_c$.

When a change of load on the control drum 12 requires a change in the width of the control pulses E, that is achieved without changing the relative positions of the drum clock pulses $S_c$ and reference clock pulses $R_c$. The change in load does, of course, cause an instantaneous change in the position of the drum clock pulses $S_c$. This in turn causes an output from the phase comparator 18 and thus a change in the bias output of the integrator 19. The bias change on the modulator 20 causes a change in the position of the trailing edge of the reference pulses R. This change in the reference pulses R will result in providing a control pulse E having a width sufficient to overcome the change in load and to bring the drum clock pulses $S_c$ back into the predetermined phase relationship to the reference clock pulses $R_c$.

In this fashion, precise position control can be achieved over as many drums as are in the system. The drums will be initially position synchronized by the indexing mechanism to an accuracy equal to the range covered by a single one of the 1,999 clock pulses per revolution. Then the drums will be further position synchronized to an accuracy equal to the precision with which the clock pulses $R_c$, $S_c$ can be generated.

FIGURE 2

FIG. 2 illustrates in somewhat greater detail the design of a pattern generator 24 and command logic unit 32 which will perform the functions described for these units in the above discussion of FIGS. 1 and 1a.

The pattern generator 44 includes a counter 50 which is adapted to respond to each incidence of a drum index pulse $S_i$ by starting to count the drum clock pulses $S_c$. In the embodiment described, the counter 50 will start counting each time it receives a drum index pulse $S_i$ and will count each successive drum clock pulse $S_c$ until a 1,999 count is attained at which time the next succeeding drum index pulse $S_i$ will appear and will start the counter 50 counting all over again. There are various output gates (not shown) in the counter 50 which, in a known logical fashion, will pass output pulses $K_1$, $K_2$, $K_3$ and $K_4$ at predetermined counts of the counter 50. These four output pulses from the counter 50 are at those counts, indicated in FIG. 1a, which determine the termination and initiation of the square wave signals 26, 28, 29 and 30. Thus, in the example shown, at the count of 949, a short pulse $K_1$ is provided at a first output terminal of the counter 50, at the count 999 another short output pulse $K_2$ is provided at a second output terminal, at the count 1,000 a third output pulse $K_3$ is provided at a third output terminal, and at the count 1,050 a fourth output pulse $K_4$ is provided at a fourth output terminal.

These counter output pulses $K_1$, $K_2$, $K_3$ and $K_4$ are applied as shown in FIG. 2 to various R–S bi-stable flip-flop units 52, 54, 56 and 58.

The four R–S flip flops employed in the pattern generator 24 are of a well known type. They are bi-stable devices having a transfer function such that a pulse input at a first one of the two input terminals will force the flip flop into one of its two output states. The flip flop will hold that state until a pulse input at the other one of its two input terminals causes it to switch to the other one of its two stable output states. For example, with regard to flip flop 52, an $S_i$ pulse will switch the flip flop into the state which provides the output signal 26. This output signal will be held until a $K_1$ pulse is applied, at which point the R–S flip flop 52 will be switched so that the output signal 26 will terminate and an output signal, which is not used in this design, is available at the other output terminal of the flip flop 52.

By a similar analysis it may be seen that one of the outputs from each of the R–S type flip flops 54, 56 and 58 will provide the output signals 28, 29 and 30 respectively. In this fashion the four line output from the pattern generator 24 is provided. Because it is a four line output it is shown in FIG. 1 as a flow line arrow having substantial thickness.

This four line output is then applied to the command logic unit 32, together with the reference index pulse $R_i$.

There are three flip flop units 60, 62 and 64 employed in this command logic unit 32 but these three flip flop units are of the D-type flip flop design; a known type of design but one that functions differently from the known R–S flip flop units employed in the pattern generator 24. The transfer function of these D-type flip flops 60, 62 and 64 should be kept in mind in order to understand the operation of this command logic unit 32 as shown in FIG. 2.

These D-type flip flops 60, 62, 64 are bi-stable devices having a transfer function such that whatever input is applied to the D input, will be transferred to the output terminal Q in response to and only in response to a switching pulse at the C input. Once the transfer has been achieved, the subsequent loss of the signal at the D input terminal will not change in the state of the output terminals unless the next successive switching pulse comes along coincident with the changed state at the D input terminal. Thus the only time that the outputs of these D type flip flops can be switched is on the incidence of a reference index $R_i$ pulse at the input terminals C. The outputs will be switched at such a time only if there has been, since the last preceding reference index pulse $R_i$, a change in the state of the signal at the input terminal D.

For example, the D type flip flop 62 provides a synch signal from its output terminal Q when a switching pulse $R_i$ arrives coincident with the notch signal 29. This provides the index synchronization (Synch) signal. As discussed in connection with FIG. 1a, the notch signal 29 exists for only a very short period of time. However, if the notch signal 29 is coincident with the reference index signal $R_i$, then the Synch signal output from the output terminal Q of the flip flop 62 will be provided and that Synch signal will continue as a steady output signal through the successive counting even though the notch signal 29 is no longer present. However, if index synchronization is lost at any time during the operation of this system then the switching signal $R_i$ will be applied to the C input terminal of the flip flop 62 at a time other than when the notch signal 29 is applied. Then the fact that the input at the terminal D is low when the switching signal $R_i$ is applied, means that the Synch signal will be terminated. The output of the flip flop 62 will thus be switched and a signal will be supplied at the $\overline{Q}$ output terminal to indicate that there is a non-synchronization. As will be described, this non-synchronization signal is employed within the command logic unit 32 to assure that the rate signals and direction signals are provided only during non-synchronization conditions.

The pattern generator 24 signals 26 and 28 occur during counts less than the notch count (see FIG. 1a). When the reference index signal $R_i$ is coincident with either of these two signals 26, 28, that is an indication that the drum 12 has to be speeded up at least temporarily in order to bring the notch 29 into synchronism with the reference index signal $R_i$. These two signals 26, 28 are applied, through an OR gate 66 to the D input terminal of the flip flop 60. When the clocking signal $R_i$ arrives at the C input terminal to the flip flop 60 as coincident with the application of either of these two signals 26, 28 then there will be an output from the Q output terminal of the flip flop 60 to ultimately provide a speed up type of direction signal. This speed up type of direction signal is passed by the AND gates 68 whenever the non-synchronization output from the flip flop 62 is present. Thus this directional signal is supplied by the command logic unit 32 only when there is a non-synchronization condition. As indicated in the discussion of FIG. 1, the speed up signal output from the command logic unit 32 is applied to the gates and trigger unit 42 so as to cause the upper side band (USB) signal to control the pulse repetition rate of the reference signals $R_a$, $R_b$, R.

Similarly, it may be seen that if the reference index signal $R_i$ is applied to the C input gate of the flip flop 60 during a time when neither the signal 26 nor the signal 28 is present, then this is an indication that the reference index signal $R_i$ is being generated either in synchronism with the notch signal 29 or in a position to the right of the notch signal 29 in FIG. 1a. If there is no index synchronization, then the drum 12 has to be at least temporarily slowed up in order to bring it into index synchronism. Accordingly, under these conditions the fact that the signal at the D input flip flop 60 is low means that the output from the Q terminal will be low and the output from the $\overline{Q}$ terminal will be high. As long as the drum 12 is not in synchronism there will also be a non-synchronization signal applied to the AND gate 70 so that the output from the $\overline{Q}$ terminal will be passed to indicate a directional signal that will cause the drum 12 to slow down. This slow down directional signal is applied to the gates in the unit 42 to cause the frequency of the reference signals $R_a$, $R_b$, R to be determined by the lower side band (LSB) signal.

Similarly, it may be seen that coincidence of the reference index signal $R_i$ with either of the pattern generator 24 output signals 28 or 30 will cause an output from the Q terminal of the D type flip flop 64 to be provided. This output signal will be passed, during non-synch conditions, by the AND gate 72 to provide a low slew rate signal. As discussed elsewhere, the low slew rate signal is applied to the gates of the unit 40 (see FIG. 1) to pass the lower frequency ($f_o/8$) of the two sets of signals in quadrature.

And, it can also readily be seen that if the reference index signal $R_i$ is applied at a time when neither of the signals 28 or 30 are present, then the output from the terminal $\overline{Q}$ of the flip flop 64 will be high and, as long as there is a non-synch condition, the AND gate 74 will be enabled so that it will pass this output signal to provide a high slew rate directional signal. This high slew rate directional signal will be appled to the gates of the unit 40 to cause the higher frequency ($f_o$) of the two sets of signals in quadrature to be passed.

FIGURE 3

FIG. 3 illustrates the design of the filter and gates unit 40 in somewhat greater detail. The four band pass filters 80, 81, 82, 83 are tuned respectively to the basic frequency of the input square wave to each filter and serve to convert the four input square waves to four sinusoidal waves having the same frequency and phase relationship to one another that the square waves have. In this fashion, the required sinusoidal shapes for the signals is provided so that the side band generator 38 can operate properly to generate the desired upper and lower side bands. The analog gates 84 and 86 are enabled when a high rate signal is present and will then serve to pass the higher frequency signals as $f_r$ and $f_r \angle 90°$. When the low rate signal is generated, it will enable gates 88, 90 to pass the lower frequency sinusoidal signals in quadrature as the signals $f_r$ and $f_r \angle 90°$ (see FIG. 1).

FIGURE 4

FIG. 4 illustrates a design of the gates and trigger unit 42 and of the gates 44. As described in connection with FIG. 1, the output of the side band generator 38 is an upper side band and a lower side band signal, both being sinusoidal signals, and having a frequency that is determined by the frequency of the input signals $f_r$, $f_r \angle 90°$ to the side band generator 38.

The two analog gates 88 and 90 operate in response to the directional signals from the command logic unit 38 to pass either the upper band signal or the lower band signal. When drum speed up is called for, then the analog gate 88 is enabled and the upper side band signal (USB) is passed. When drum slow down is called for, then the analog gate 90 is enabled and the lower side band signal (LSB) is passed.

Whichever of the two side band signals is passed is then applied to a band pass filter 92 to provide an improved sinusoidal shape for the input signal to the Schmitt trigger 94. The filter 92 has a band pass covering a range $\pm f_o$ about the frequency of the reference clock signal $R_c$ so as to pass whichever of the four signals that may be developed. The Schmitt trigger 94 converts the sinusoidal signal to the initial reference pulse train signal $R_a$ having a pulse repetition rate equal to the frequency of the side band passed by the gates 88 or 90.

The gates 44 are essentially two coincidence gates 96, 98. The gate 96 is enabled by the synch signal and the gate 98 is enabled by the non-synch signal. The input to the gate 96 is the reference clock signal $R_c$ and the input to the gate 98 is the initial reference pulse train $R_a$. Thus when a synch signal is developed by the command logic 38, the intermediate reference signal $R_b$ is the reference clock pulses $R_c$. When synchronization has not yet been achieved and thus the non-synch signal is present, the intermediate reference signal is the initial reference pulses $R_a$.

What is claimed is:

1. In a control system for controlling the velocity and position of a continuously rotating member wherein the phase and frequency of a main measurement signal is compared with the phase and frequency of a command signal to provide a control signal that locks the rotational velocity of the member to that dictated by the frequency of the command signal, the improvement comprising:
   (A) index measurement signal means coupled to said member to provide a measurement index signal representing at least one predetermined position of said member,
   (B) main reference signal source to provide a main reference signal,
   (C) means to derive a reference index signal from said main reference signal,
   (D) a comparator for comparing said measurement index signal and said reference index signal to provide an index error direction signal having a first value to indicate that said measurement index signal leads said reference index signal and a second value to indicate that said measurement index signal lags said reference index signal,
   (E) means to provide an intermediate signal having a frequency less than the frequency of said main reference signal,
   (F) side band generator means responsive to said main reference signal and to said intermediate signal to provide (a) an upper side band signal having a frequency equal to the sum of the frequencies of said main reference signal and of said intermediate signal and (b) a lower side band signal having a frequency equal to the difference between the frequency of said main reference signal and the frequency of said intermediate signal, and
   (G) gate means coupled to said side band signals and responsive to the value of said index error direction signal to provide said command signal as a signal (a) equal in frequency to said upper side band signal when said index error direction signal has a first value, (b) equal in frequency to said lower side band signal when said index error direction signal has a second value, and (c) equal in frequency to said main reference signal when said error signal has a zero value.

2. The control system improvement of claim 1 further characterized by:
   a pulse width modulator coupled to the output of said gate means and responsive to the phase difference between said main reference signal and said main measurement signal to provide said command signal as a signal having that phase relationship to said main measurement signal that is required to maintain the position of said member such that a predetermined phase relationship is maintained between said main reference signal and said main measurement signal,
   said pulse width modulator being effective to continuously monitor the phase displacement between said main reference signal and said main measurement signal to provide adjustments in the phase of said command signal to maintain said predetermined phase relationship,
   whereby the phase relationship between said main reference signal and said command signal is equal to the phase relationship between said command signal and said main measurement signal.

3. The control system of claim 1 wherein:
   said comparator includes means to provide a zero index error signal when said measurement index signal is coincident with said reference index signal,
   said gate means includes
   (a) first subsidiary gate means coupled to said side band signals and responsive to the value of said index error direction signal to provide (i) an output signal at a frequency equal to that of said upper side band signal when said index error direction signal has a first value and (ii) equal in frequency to said lower side band signal when said index error direction signal has a second value, and
   (b) second subsidiary gates being coupled to said main reference signal and to the output of said first subsidiary gate means and responsive to said zero index error signal to provide said command signal as (i) the output of said first subsidiary gate means when there is an index error, and (ii) said mean reference signal when there is zero index error.

4. The control system of claim 1 wherein said means to provide an intermediate signal comprises:
   a frequency source to provide a base signal,
   a frequency divider and phase shifter network to provide (a) a first pair of intermediate signals in quadrature and (b) a second pair of intermediate signals in quadrature, the frequency of said second pair of signals being substantially less than the frequency of said first pair of signals,
   said comparator including means to provide an index error rate signal having a first value to indicate that said measurement index signal is displaced from said reference index signal by more than a predetermined number of degrees of displacement and having a second value to indicate that said measurement index signal is displaced from said reference index signal by a number of degrees less than said predetermined value, and
   gate means responsive to said index error rate signal and to said two intermediate signal pairs in quadrature to select one of said signal pairs in quadrature as said intermediate signal as a function of the value of said index error rate signal.

5. The control system improvement of claim 3 further characterized by:
   a pulse width modulator coupled to the output of said gate means and responsive to the phase difference between said main reference signal and said main measurement signal to provide said command signal as a signal having that phase relationship to said main measuremnet signal that is required to maintain the position of said member such that a predetermined phase relationship is maintained between said man reference signal and said main measurement signal,
   said pulse width modulator being effective to continuously monitor the phase displacement between said main reference signal and said main measurement signal to provide adjustments in the phase of said comamnd signal to maintain said predetermined phase relationship,
   whereby the phase relationship between said main reference signal and said command signal is equal to the phase relationship between said command signal and said main measurement signal.

6. The control system improvement of claim 4 further characterized by:
   a pulse width modulator coupled to the output of said gate means and responsive to the phase difference between said main reference signal and said main measurement signal to provide said command signal as a signal having that phase relationship to said main measurement signal that is required to maintain the position of said member such that a predetermined phase relationship is maintained between said main reference signal and said main measurement signal, said pulse width modulator being effective to continuously monitor the phase displacement between said main reference signal and said main measurement signal to provide adjustments in the phase of said command signal to maintain said predetermined phase relationship, whereby the phase relationship between said main reference signal and said command signal is equal to the phase relationship between said command signal and said main measurement signal.

7. The control system of claim 4 wherein:

said comparator includes means to provide a zero index error signal when said measurement index signal is coincident with said reference index signal, said gate means includes (a) first subsidiary gate means coupled to said side band signals and responsive to the value of said index error direction signal to provide (i) an output signal at a frequency equal to that of said upper side band signal when said index error direction signal has a first value and (i) equal in frequency to said lower side band signal when said index error direction signal has a second value, and (b) second subsidiary gates being coupled to said main reference signal and to the output of said first subsidiary gate means and responsive to said zero index error signal to provide said command signal as (i) the output of said first subsidiary gate means when there is an index error, and (ii) said main reference signal when there is zero index error.

8. The control system improvement of claim 7 further characterized by:

a pulse width modulator coupled to the output of said gate means and responsive to the phase difference between said main reference signal and said main measurement signal to provide said command signal having that phase relationship to said main measurement signal that is required to maintain the position of said member such that a predetermined phase relationship is maintained between said main reference signal and said main measurement signal, said pulse width modulator being effective to continuously monitor the phase displacement between said main reference signal and said main measurement signal to provide adjustments in the phase of said command signal to maintain said predetermined phase relationship, whereby the phase relationship between said main reference signal and said command signal is equal to the phase relationship between said command signal and said main measurement signal.

9. In a control system for controlling the velocity and position of a member having periodic motion wherein the phase and frequency of a main measurement signal is compared with the phase and frequency of a command signal derived from a main reference signal to provide a control signal that locks the velocity of the member to that dictated by the frequency of the command signal, the improvement comprising:

(A) index measurement signal means coupled to said member to provide a measurement index signal representing at least one predetermined position of said member, (B) index reference signal means coupled to said main reference signal to derive an index reference signal from said main reference signal, (C) a comparator for comparing said index measurement signal and said index reference signal to provide an index error signal, (D) side band generator means responsive to said main reference signal and to said index error signal to provide a side band signal having side band relationship to said main reference signal, and (E) gate means coupled to said side band signal and to said main reference signal to provide said command signal as a signal (a) equal in frequency to said side band signal when said index error signal indicates an index error, and (b) equal in frequency to said main reference signal when there is no index error.

10. The control system improvement of claim 9 wherein:

said index error signal has a first value when said index measurement signal leads said index reference signal and a second value when said index measurement signal lags said index reference signal, said side band signal is an upper side band when said index error signal has one of said first and second values and said side band signal is a lower side band signal when said index error signal is the other of said first and second values.

11. The control system improvement of claim 9 wherein:

the frequency devitaion of said side band signal from said main reference signal is of a first magnitude when said index error signal indicates a displacement between said index measurement signal and said index reference signal less than a predetermined displacement magnitude and said side band has a frequency deviation from said main reference signal equal to a second magnitude when the displacement between said index measurement signal and said index reference signal is greater than said displacement predetermined magnitude.

12. The control system improvement of claim 10 wherein:

the frequency deviation of said side band signal from said main reference signal is of a first magnitude when said index error signal indicates a displacement between said index measurement signal and said index reference signal less than a predetermined displacement magnitude and said side band has a frequency deviation from said main reference signal equal to a second magnitude when the displacement between said index measurement signal and said index reference signal is greater than said displacement predetermined magnitude.

13. In the method of controlling the velocity and position of a member having periodic motion, wherein a main measurement signal is compared with a command signal to provide a control signal that locks the velocity of the member to that dictated by the frequency of the command signal, the improvement comprising the steps of:

(A) comparing a measurement index signal generated once for each complete cycle of said member with a reference index signal derived from the main reference signal to provide an index error signal, (B) generating a side band of the main reference signal, the side band generated being a function of the value of said index error signal, (C) employing the frequency of said side band signal as the frequency of the command signal until the index error is reduced to zero, and (D) employing the frequency of the main reference signal as the frequency of the command signal when the index error is zero.

14. The method of claim 13 wherein:

said index error signal has a first value when said index measurement signal leads said index reference signal and a second value when said index measurement signal lags said index reference signal, said side band signal is an upper side band when said index error signal has one of said first and second values and said side band signal is a lower side band signal when said index error signal is the other of said first and second values.

15. The method of claim 13 wherein:
the frequency deviation of said side band signal from said main reference signal is of a first magnitude when said index error signal indicates a displacement between said index measurement signal and said index reference signal less than a predetermined displacement magnitude and said side band has a frequency deviation from said main reference signal equal to a second magnitude when the displacement between said index measurement signal and said index reference signal is greater than said displacement predetermined magnitude.

16. The method of claim 14 wherein:
the frequency deviation of said side band signal from said main reference signal is of a first magnitude when said index error signal indicates a displacement between said index measurement signal and said index reference signal less than a predetermined displacement magnitude and said side band has a frequency deviation from said main reference signal equal to a second magnitude when the displacement between said index measurement signal and said index reference signal is greater than said displacement predetermined magnitude.

References Cited

UNITED STATES PATENTS

| | | | |
|---|---|---|---|
| 3,105,927 | 10/1963 | Flatten | 318—20.310 |
| 3,458,786 | 7/1969 | Thompson | 318—20.260 |
| 3,460,012 | 8/1969 | Henegar | 318—20.320 |

ORIS L. RADER, Primary Examiner

T. LANGER, Assistant Examiner

U.S. Cl. X.R.

318—18

UNITED STATES PATENT OFFICE
CERTIFICATE OF CORRECTION

Patent No. 3,560,827          Dated February 2, 1971

Inventor(s)     MICHAEL S. SCHILLER

It is certified that error appears in the above-identified patent and that said Letters Patent are hereby corrected as shown below:

Col. 1, line 68, "drum" should be -- drums --.

Col. 2, line 12, "drum" should be -- drums --.

Col. 4, line 60, "comparators" should be -- comparator --.

Col. 7, line 36, after "1/8" insert -- of the --.

Col. 13, line 67, "betwen" should be -- between --.

Col. 14, line 47, "measuremnet" should be -- measurement --.

Col. 14, line 57, "comamnd" should be -- command --.

Col. 15, line 21, "(i)" should be -- (ii) --.

Signed and sealed this 10th day of August 1971.

(SEAL)
Attest:

EDWARD M. FLETCHER, JR.          WILLIAM E. SCHUYLER, JR.
Attesting Officer                Commissioner of Patents